C. E. L. LIPMAN.
AIR PUMP STARTER.
APPLICATION FILED APR. 19, 1913.

1,126,041.

Patented Jan. 26, 1915.

UNITED STATES PATENT OFFICE.

CARL E. L. LIPMAN, OF BELOIT, WISCONSIN, ASSIGNOR TO LIPMAN AIR APPLIANCE COMPANY, OF BELOIT, WISCONSIN, A CORPORATION OF WISCONSIN.

AIR-PUMP STARTER.

1,126,041.  Specification of Letters Patent.  Patented Jan. 26, 1915.

Application filed April 19, 1913. Serial No. 762,369.

*To all whom it may concern:*

Be it known that I, CARL E. L. LIPMAN, a citizen of the United States, residing at Beloit, in the county of Rock and State of Wisconsin, have invented certain new and useful Improvements in Air-Pump Starters, of which the following is a specification.

This invention relates to air pumps such as are adapted to furnish air to be used for the various purposes to which air under pressure is applied, and more particularly to that type of air pump adapted to be driven by a continuously rotating member and to furnish a supply of air until a predetermined pressure of air has been reached. In air appliance systems where such a type of air pump is employed, pumps have been continuously driven by a motive power to maintain a certain pressure of air in the system or air supply reservoir by automatic actuation of the pump valves to maintain such pressure. In this method, the pump although not generating air is in constant operation, resulting in unnecessary wear thereupon. The object of my invention is to provide an air pump having a clutch driving connection with the motive power and to provide means operable by air pressure for actuating the clutch whereby the pump will be operated supplying air until a predetermined pressure has been attained, when said means will automatically disengage the clutch and stop the working of the pump. With this means for maintaining a pressure of air the valves in the pump are entirely independent from any control other than their common operation, so that the one controlling means for actuating the entire pump answers for a multiple of pump cylinders.

Figure 1:
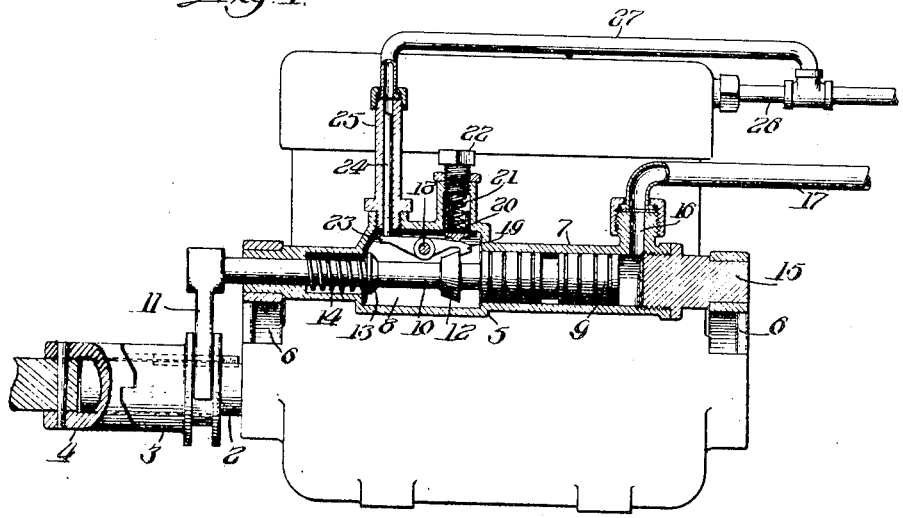
Figure 2:
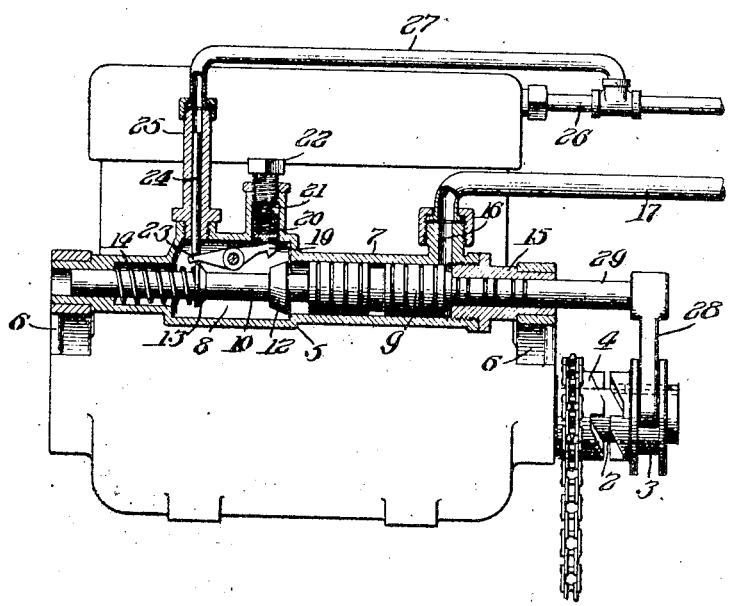

In the accompanying drawings: Figure 1 illustrates an air pump having applied thereto my novel clutch actuating means which is shown in longitudinal section, the pump being driven by a common clutch drive. Fig. 2 is a similar view with the pump driven from the opposite end by a chain drive, the clutch shown disengaged.

A conventional multi-cylinder type air pump 1 is shown in outline, that in Fig. 1 having splined on its crank-shaft 2 a sliding clutch member 3 which is shown engaged with a constantly driven clutch member 4. A casing 5 inclosing the clutch actuating means is carried to the near side of the pump by brackets 6 and is formed with a cylinder 7 and a catch compartment 8. A piston 9 located in the cylinder, is formed with a stem 10 which has a bearing in one end of the casing and projects therethrough carrying a yoked lever 11 in engagement with the clutch member 3, a tapered peripheral head 12 located adjacent the inner end of the plunger, and a cap 13 which forms an abutment against which the coiled spring 14 exerts a tension to force the plunger to the right and to disengage the clutch members. The end 15 of the casing forms a closed head for the cylinder and a port 16 opening into the cylinder adjacent this head communicates through pipe 17 with a valve or means (not shown) under the control of the operator by which at a desired time an initial charge of air is delivered to the cylinder 7. Pivoted at 18 is a catch having a head 19 held into engagement with the tapered head 12 by the cap 20 which is yieldingly depressed and adjustable by the spring 21 and screw 22, and an oppositely extending end 23 upon which rests a plunger 24 located in the extension neck 25. Air generated by the pump is discharged therefrom through pipe 26 to a supply tank or to whatsoever means the air is to be put to use, and a pipe section 27 leads from this discharge 26 to the extension neck 25.

Assuming the pump to be continuously driven as the members are positioned in Fig. 1, air will be discharged from the pump through pipe 26 until a predetermined pressure of air has been attained at this discharge side, when the pressure of air, which is upon plunger 24, will force said plunger down, thereby disengaging the catch head 19 from the tapered head 12 and allowing spring 14 to move the piston and stem to the right, throwing out the clutch connection and stopping the operation of the pump. It will be noticed that for the plunger 24 to be depressed the tension of spring 21 must be overcome, therefore by the adjustment of screw 22 the degree of air pressure required may be varied. When it is desired to put the pump into operation, and to replenish the supply of air, air is admitted at will by the operator through pipe 17 to the cylinder 7, moving the piston to the left, connecting the pump with the driving member and locking catch head 19 with the piston member, thereby driving the pump until the required pressure has been reached, when the pump will be stopped as above described In Fig. 2 parts alike to those in Fig. 1 have like reference numerals, this figure merely showing a different form of drive. In this form the crank-shaft 2 extends beyond the right hand end of the pump, the constantly driven clutch member 4 is chain driven, and the slidable clutch member 3 splined to the crank-shaft is actuated by the yoked lever 28 carried by the extension stem 29 formed at the head of piston 9, the stem bearing in the end 15 of the casing. In this figure the clutch is shown disengaged and the actuating means therefore in an inoperative position. The operation of this type of clutch and actuating means is as the above description applying to Fig. 1.

I claim as my invention.

1. In a mechanism of the character described, the combination with an air pump and a discharge pipe associated therewith, of means for driving said pump, controlling means for rendering said driving means operative or inoperative to drive said pump, means connected to said controlling means actuated by fluid pressure to render the driving means operative, automatic means for actuating said last named means to render said driving means inoperative, means for throwing said automatic means into operation when the pressure in said discharge pipe has attained a predetermined degree, and means for applying fluid pressure at will to said controlling means to render the driving means operative.

2. In a mechanism of the character described, the combination of an air pump, means for driving said pump, a cylinder, a piston disposed in said cylinder, a piston rod, a connection between said piston rod and said driving means whereby the driving means is rendered operative or inoperative upon movement of the rod, a spring arranged to normally maintain said driving means in inoperative position, a shoulder on said piston rod, a latch pivoted adjacent to said rod and adapted to engage with said shoulder, means for admitting at will fluid under pressure to said cylinder on one side of said piston whereby the piston is moved against the force of said spring to render said driving means operative and dispose said shoulder in coöperative relation with said pivoted latch, an adjustably mounted spring for urging said latch into engagement with said shoulder, and pressure-operated means for releasing said latch against the force of said spring when the pressure in the discharge from the pump reaches a predetermined point to thereby permit said driving means to be moved to inoperative position by said first mentioned spring.

3. In a mechanism of the character described, the combination of an air pump, means for driving said pump, a cylinder, a piston disposed in said cylinder, a piston rod, a connection between said piston rod and said driving means whereby the driving means is rendered operative or inoperative upon movement of the rod, a spring arranged to normally maintain said driving means in inoperative position, a shoulder on said piston rod, a latch pivoted adjacent to said rod and adapted to engage with said shoulder, means for admitting at will fluid under pressure to said cylinder on one side of said piston whereby the piston is moved against the force of said spring to render said driving means operative and dispose said shoulder in coöperative relation with said pivoted latch, an adjustably mounted spring for urging said latch into engagement with said shoulder, and means controlled by the pressure generated by the pump for releasing said latch against the force of said spring to thereby permit said driving means to be moved to inoperative position by said first mentioned spring.

In testimony whereof I have hereunto set my hand in presence of two subscribing witnesses.

CARL E. L. LIPMAN.

Witnesses:
 JOHN F. McCONNER, Jr.,
 E. D. E. N. BEHEL.